US008612855B2

(12) United States Patent
Greenspan et al.

(10) Patent No.: US 8,612,855 B2
(45) Date of Patent: Dec. 17, 2013

(54) METHOD AND SYSTEM FOR CONTINUOUS NOTIFICATIONS USING SUBLIMINAL AND SUPRALIMINAL CUES

(75) Inventors: Steven Greenspan, Scotch Plains, NJ (US); Gabriel Silberman, Hastings on Hudson, NY (US)

(73) Assignee: CA, Inc., Islandia, NY (US)

( * ) Notice: Subject to any disclaimer, the term of this patent is extended or adjusted under 35 U.S.C. 154(b) by 144 days.

(21) Appl. No.: 12/904,443

(22) Filed: Oct. 14, 2010

(65) Prior Publication Data

US 2012/0096398 A1 Apr. 19, 2012

(51) Int. Cl.
*G06F 3/01* (2006.01)

(52) U.S. Cl.
USPC .......................................... 715/702

(58) Field of Classification Search
USPC .......................................... 715/702, 708, 709
See application file for complete search history.

(56) References Cited

U.S. PATENT DOCUMENTS

| | | | | |
|---|---|---|---|---|
| 7,024,626 | B2 * | 4/2006 | Ko | 715/715 |
| 7,120,865 | B1 * | 10/2006 | Horvitz et al. | 715/210 |
| 7,137,074 | B1 * | 11/2006 | Newton et al. | 715/835 |
| 7,417,650 | B1 * | 8/2008 | Horvitz | 715/765 |
| 8,040,223 | B2 * | 10/2011 | Mortimer et al. | 340/407.1 |
| 8,078,233 | B1 * | 12/2011 | Sennett et al. | 455/567 |
| 8,156,434 | B2 * | 4/2012 | Finamore | 715/705 |
| 2003/0112269 | A1 * | 6/2003 | Lentz et al. | 345/738 |
| 2005/0197792 | A1 * | 9/2005 | Haeuptle | 702/66 |
| 2005/0223069 | A1 * | 10/2005 | Cooperman et al. | 709/206 |
| 2009/0204927 | A1 * | 8/2009 | Terasaki | 715/781 |
| 2011/0004845 | A1 * | 1/2011 | Ciabarra | 715/808 |
| 2011/0289451 | A1 * | 11/2011 | Fischer | 715/808 |

OTHER PUBLICATIONS

Meeter M. et al, "A competitive integration model of exogenous and endogenous eye movements", Biol Cybern, Feb. 17, 2010, pp. 271-291.
Pretorius M. et al., "The contribution of eye tracking to the usability evaluation of network management tools", Department Linent of Computer Science & Information Systems, Nelson Mandela Metropolitan University, Port Elizabeth.
Ludwig C. et al., "Oculomotor capture by transient events: A comparison of abrupt onsets, offsets, motion, and flicker", Journal of Vision, United Kingdom, Oct. 23, 2008, pp. 1-16.
Irwin D. et al., "Attentional and oculomotor capture by onset, luminance and color singletons", Vision Research, vol. 40, Issues 10-12, Jun. 2000, pp. 1443-1458.

* cited by examiner

*Primary Examiner* — Rashawn Tillery
(74) *Attorney, Agent, or Firm* — Myers Bigel Sibley & Sajovec, P.A.

(57) ABSTRACT

A method of notifying a person using a computer includes providing a computer system including at least one sensory cueing component. The method includes defining a subliminal and a supraliminal range of at least one human sense. A cue may be defined and includes a variable attribute, and the cue is directed to the at least one human sense. An alert level may be associated with the message and the alert level may be classified as being in the subliminal or supraliminal range. The method may include a presentation methodology of the cue and the message. The cue may be initiated and presented in either the subliminal range or the supraliminal range and directed to the at least one human sense in the user's sensory environment. The user acknowledges the cue and the message in either the subliminal or supraliminal range, before the cue is removed from the user's sensory environment.

21 Claims, 4 Drawing Sheets

METHOD AND SYSTEM FOR CONTINUOUS NOTIFICATIONS USING SUBLIMINAL AND SUPRALIMINAL CUES

FIELD

The present disclosure relates generally to a method and system of notifying a person using a computer system, and more particularly, the present disclosure relates to a method and system of notifying a person using a computer system by using cues.

BACKGROUND

Information systems and technology management require monitoring of complex systems, as well as, an increased number of tasks for a person to be aware of and handle. Monitoring the integrity and behavior of a complex system, such as a network of computers, may be an important component of information systems (IS) management. As the complexity and number of tasks for monitoring increase, distinctions are required between events or signals that require immediate human operator response (e.g., a critical alarm or notification), and those events which do not require immediate attention (e.g., useful information that provides context but does not require a deliberate or immediate action), for example, information which can be provided peripherally to a user's area of attention. Currently, a user interface may incorporate the distinction between critical and non-critical signals through color coding (for example, red for critical alarm, green for information-only), and/or by placing critical information in the center of a monitor (for example, as a pop-up window which must be intentionally dismissed), while placing less critical information along the periphery of the monitor. However, one problem with the above approach is that information in the periphery of the monitor is often ignored.

It would therefore be desirable to draw the attention of a user in a measured manner without creating a nuisance or unnecessary distraction to the user from a more important or critical task. There is further a need to draw a user's attention for notifying the user that information has become more critical.

SUMMARY

In an aspect of the present disclosure, a method of notifying a person using a computer includes a non-transitory computer readable storage medium encoded with a computer program embodied therein. The method comprises: providing a computer system including at least one sensory cueing component; defining a subliminal range of at least one human sense, the at least one human sense being one or more of: sight, hearing, or touch; defining a supraliminal range of the at least one human sense; defining a cue directed to the at least one human sense, the cue being associated with a message; defining an attribute of the cue for perception by a user, the attribute being measurably variable; defining the user's sensory environment; determining an alert level associated with the message and classifying the alert level as in the subliminal or supraliminal range; determining a presentation methodology of the cue and the message, the presentation methodology including: the alert level classification; initiating the cue in either the subliminal range or the supraliminal range directed to the at least one human sense in the user's sensory environment, presenting the cue according to the presentation methodology; determining when an acknowledgement of the cue and the message by the user is completed in either the subliminal or supraliminal range; and removing the cue and the message from the user's sensory environment.

BRIEF DESCRIPTION OF THE DRAWINGS

These and other features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the disclosure in conjunction with the detailed description. In the drawings.

DETAILED DESCRIPTION

A method of signaling a warning or orienting responses in user interfaces is disclosed. For example, a visual cue using subliminal cues can be used to capture attention for non-critical information, and may be used to induce visual scanning behavior for complex visual scenes. As the criticality of the event or information increases, attributes of the cue (for example, changes in color, intensity, or location) can increase in intensity from subliminal to supraliminal levels. A subliminal cue exists or operates below a threshold of perception or consciousness. The cue or stimuli is insufficiently intense to produce a discrete sensation, but may be designed to be intense enough to influence the mental processes or the behavior of a person. A supraliminal cue or stimuli is above a threshold of perception of a stimulus for a person, and thereby, the person is conscious of the cue or stimuli.

A user is unaware of the subliminal cues, and thus, should be less distracted by the cue, and more able to ignore the cue when there are more significant events on the display. A system and method according to one embodiment of the present disclosure may guide a user's attention to peripheral information without significantly distracting users from more critical work. The present disclosure in one embodiment can be applied to multiple human senses, or to a combination of senses, by providing cues directed to corresponding human senses. For example, a multi-sensory cue using both audio and visual information could be used according to one embodiment of the present disclosure.

Figure 1:
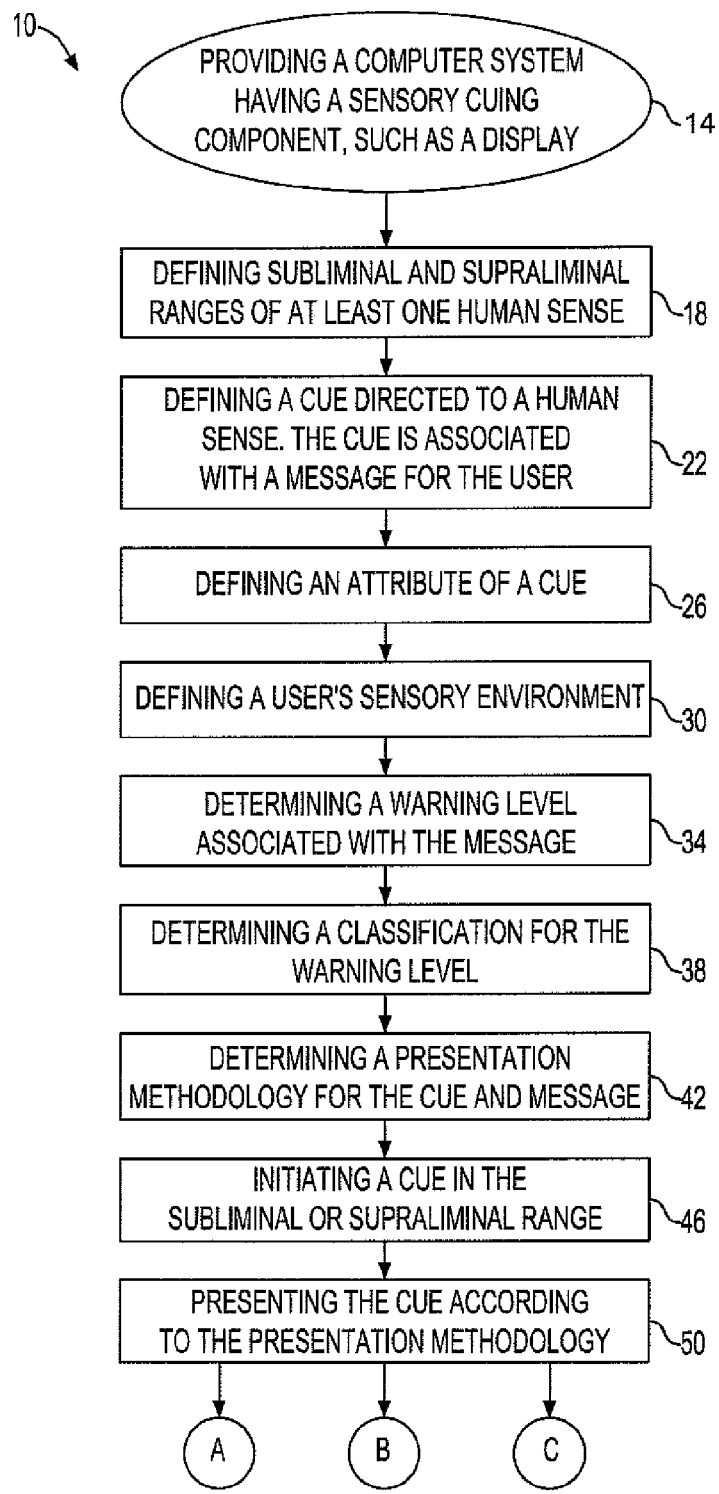
FIG. 1 is a flow chart of an embodiment of a method according to the disclosure.
Figures 2, 3, 4:
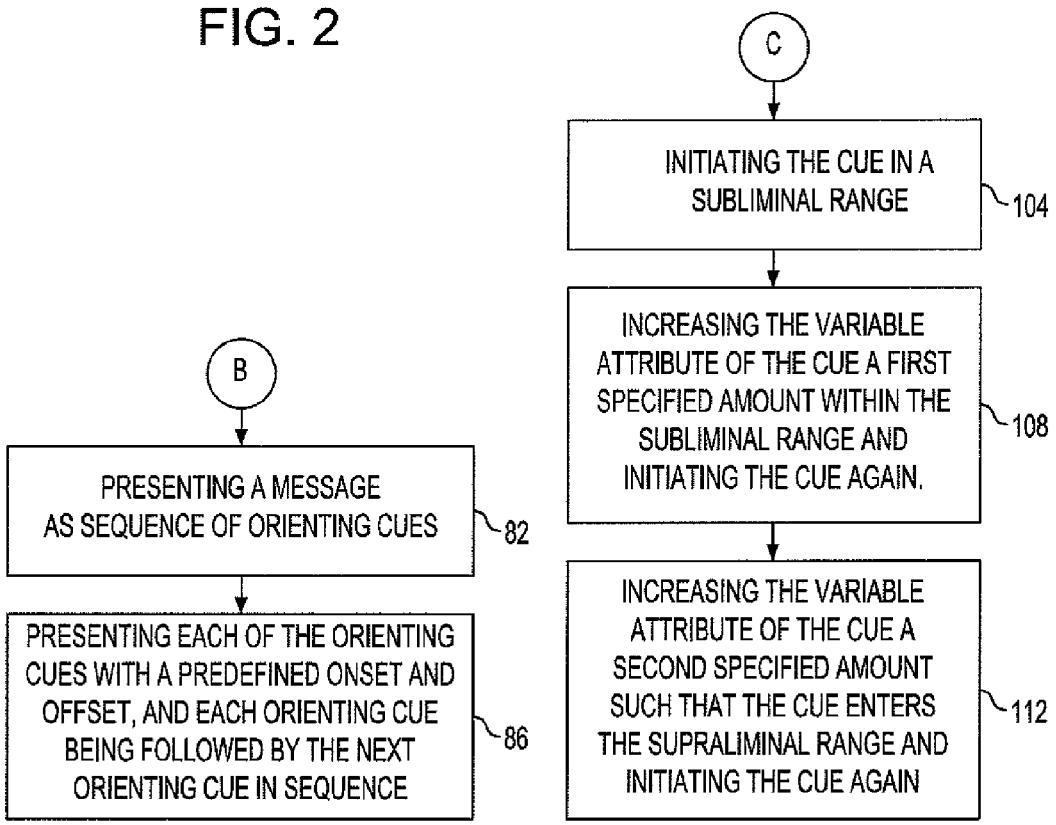
FIG. 2 is a flow chart continuing the flow chart of FIG. 1.
FIG. 3 is a flow chart according to an embodiment of the disclosure following the method shown in FIG. 1.
FIG. 4 is a flow chart according to an embodiment of the disclosure following the method shown in FIG. 1.
Figure 5:
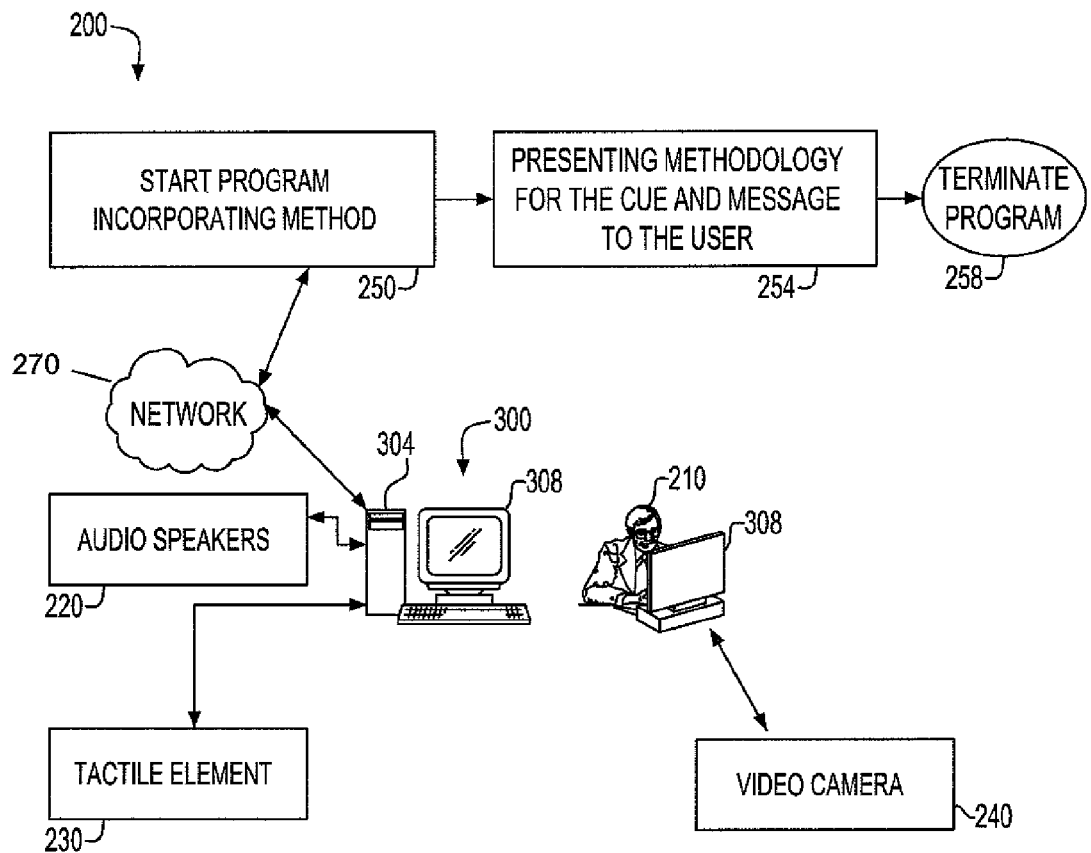
FIG. 5 is a schematic block diagram of an embodiment of the disclosure.

Referring to FIG. 1, in an embodiment of the disclosure a method 10 of notifying a person uses a computer system 300 (shown in FIGS. 4-5). The computer system includes at least one sensory cueing component, such as a computer display or monitor 308, which further may include a liquid crystal display (LCD) display, as in step 14. Other sensory elements may be used in lieu of, or in combination with, a visual element such as the display or monitor. Examples of alternative sensory elements include auditory elements, or tactile elements. Step 18 includes defining subliminal and supraliminal ranges of at least one human sense. The human sense may include, alone or in combination: sight, hearing, or touch. Step 22 includes defining a cue directed to the human sense, and the cue being associated with a message for the user. Step 26 includes defining an attribute of the cue for perception by a user. The attribute is measurably variable. For example, an attribute may be a color of a visual cue. Step 30 includes defining the user's sensory environment, for example the area of a computer display for a visual cue. Also, different forms of visual change have the potential to capture attention and cause saccadic shifts, e.g., abrupt appearance, luminance changes, and motion onset. One strategy for capturing a user's attention may include directing a user's attention to a particular part of a display due to orienting events or cues on the display.

Step 34 includes determining an alert level associated with the message. The event, for example, may be categorized as a warning, or an event, or a critical warning. Step 38 includes determining a classification for the alert level. The classifications include: when the alert level is beneath a threshold defining the supraliminal range, classifying the message as subliminal; when the alert level is at the threshold, classifying the message as supraliminal; and when the alert level exceeds the threshold, classifying the message as critical. Step 42 includes determining a presentation methodology of the cue and the message. The presentation methodology includes the alert level classification. Step 46 includes initiating the cue in either the subliminal range or the supraliminal range directed to the at least one human sense in the user's sensory environment. Step 50 includes presenting the cue according to the presentation methodology. The presentation methodology may further include: repeating the cue a specified number of times; shifting the cue between the subliminal and supraliminal ranges; and increasing or decreasing the attribute of the cue. Referring to FIG. 2, step 54 includes determining when an acknowledgement of the cue and the message by the user is completed in either the subliminal or supraliminal range. Step 58 includes removing the cue and message from the user's sensory environment.

The method 10 may further comprise presenting a single message in a periphery area or at a center of attention of the user's sensory environment in accordance with a warning level. Further, the message may be presented using a pop-up presentation at the center of attention of the use's sensory environment when the message is classified as critical.

The method 10 may further include additional steps, as follows. Referring to FIG. 3, step 82 includes presenting a message as a sequence of orienting cues. Step 86 includes presenting each of the orienting cues with a predefined onset and offset, and each of the orienting cues being followed by the next orienting cue in the sequence. For example, the sequence of orienting cues may be presented at a series of locations in a visual field, wherein the sequence of cues is organized for moving the user's attention through the visual field. In another embodiment, the computer program may provide feedback from eye tracking the user using a video camera 240.

In another embodiment of the present disclosure, the method may further comprise changing the presentation methodology correspondingly with an increasing or decreasing warning level. The change in presentation methodology may include: increasing or decreasing an attribute of a cue, such as a change in motion of the cue, luminance, or spatial frequency of the cue; or adding or subtracting a second cue. The changes in presentation methodology may also shift between subliminal and supraliminal ranges by adjusting the cue attributes.

The method 10 may further include the following steps directed to shifting a cue from the subliminal range to the supraliminal range. Referring to FIG. 4, step 104 includes initiating the cue in the subliminal range directed to the at least one human sense in the user's sensory environment. Step 104 may include repeating the cue a specified number of times. Step 108 includes increasing the variable attribute of the cue a first specified amount within the subliminal range and initiating the cue again. Step 112 includes increasing the variable attribute of the cue a second specified amount such that the cue enters the supraliminal range and initiating the cue again. Step 112 may further include repeating the cue a specified number of times in the supraliminal range, and increasing the variable attribute of the cue and initiating the cue in the supraliminal range again. The acknowledgement of the cue by the user is completed in the supraliminal range, which may be when the alert level is at the threshold, as discussed above, which classifies the message as supraliminal, or when the alert level exceeds the threshold, which classifies the message as critical. As discussed above regarding step 58 (shown in FIG. 2), the cue is removed from the user's sensory environment after acknowledgement of the cue and message by the user.

In one example, a cue is directed to the human sense of sight. The attribute of the cue directed to the human sense of sight may include: brightness, color, or flashing, or combinations thereof. In another example, a cue is directed to the human sense of hearing, and the attribute of the cue may include: loudness, tone, pitch, and frequency, or combination thereof. Other attributes are possible.

In an embodiment of the disclosure, the sensory cue may be selected from a group, for example, comprising: a visual cue on a computer display; an audible cue from a speaker connected to the computer; a tactile cue from a tactile element connected to the computer.

In another embodiment of the disclosure, multiple cues may be used simultaneously or in sequence. The method 10 may further include the following steps of defining a plurality of cues, wherein each of the plurality of cues are directed to different human senses corresponding to the plurality of cues. Two or more of the plurality of cues are initiated in the subliminal range of the corresponding human sense. Variable attributes of the cues are increased a specified amount. The variable attributes may be increased one or more times, such that the cue enters the supraliminal range of the corresponding human sense. Similarly to step 58 as discussed above, the cues are removed from the user's sensory environment after acknowledgement of the cues and the message by the user.

Referring to FIG. 5, a schematic block diagram 200 according to one embodiment of the disclosure generally follows the method 10 described above. A computer system 300 includes a computer 304 and a computer display 308. In the present embodiment, a user 210 is working on the computer and the display, and the user's 210 sensory environment includes the display 308. The user's sensory environment further includes an auditory element embodied as audio speakers 220, and a tactile element 230 which may be embodied as a vibrating device. A video camera 240 may be used to track eye movements of the user 210. In one embodiment of the disclosure a computer program 250 incorporating the method 10 may be initiated remotely, for example, over a network 270, which may include the Internet. The presentation methodology for the cue and message is presented to the user in step 254, using one or more of the sensory cuing components, or a combination of the display 308, audio speakers 220, and the tactile element 230. Once the user 210 acknowledges the message and cue, the program is terminated in step 258. The user may acknowledge the message and cue by completing the task directed by the message, and/or manually ending the cue and/or message. For example, using a visual message and cue, the user may terminate the cue and message, by clicking with a mouse, a message dialog box.

The present disclosure may provide for increased awareness of relevant messages or events without needlessly distracting a computer user, or significantly interfering with the user's work, unless the criticality of the message warrants such an interruption. In one embodiment of the disclosure, the disclosure may be employed as a training mechanism to teach novices how to attend to large complex displays, especially those requiring vigilance monitoring. In this vein, at least some of the tacit knowledge of experts in vigilance monitoring is embedded in the way the experts distribute and focus their attention. The present disclosure can be used to capture this type of tacit knowledge, for example, by recording eye motion of the expert user directed to a complex display.

Figure 6:
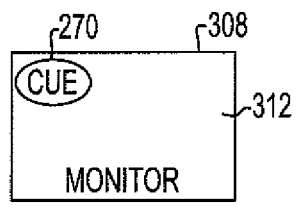
FIG. 6 is a block diagram of a computer monitor having a cue positioned on its screen.
Figure 7:
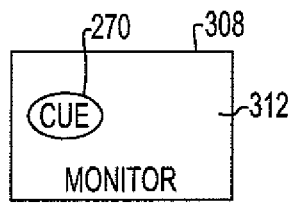
FIG. 7 is a block diagram of the computer monitor having the cue shown in FIG. 6 repositioned on its screen.
Figure 8:
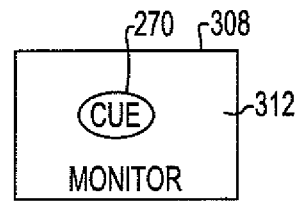
FIG. 8 is a block diagram of the computer monitor having the cue shown in FIG. 7 repositioned on its screen.

In a further example, referring to FIGS. 6-8, a cue 270 is directed to the human sense of sight using the monitor 308. As discussed above, one or more attributes of the cue 270 directed to the human sense of sight may include: brightness, color, or flashing, or combinations thereof. Further, in one embodiment of a presentation methodology, the cue 270 may change position on the screen 312 of the monitor 308 for directing the user's attention through a complex visual display on the screen 312. The attributes of the cue 270 may be in a subliminal range relative to a visual cue. For example, the cue 270 may begin in a corner of the screen 312, in the periphery of the user's sensory environment. The cue 270 may then move towards the middle of the screen 312 for directing the user's attention with the cue. Finally, the cue 270 may be positioned in the center of the screen 312 while continuing to direct the user's attention with the cue 270. Further, the cue 270 may continue to other positions, or repeat a sequence of positions. In a variation of the above, in the supraliminal range, the user may perform a cued task, for example, clicking a link or the cue using a mouse, or otherwise acknowledging the cue 270.

Figure 9:
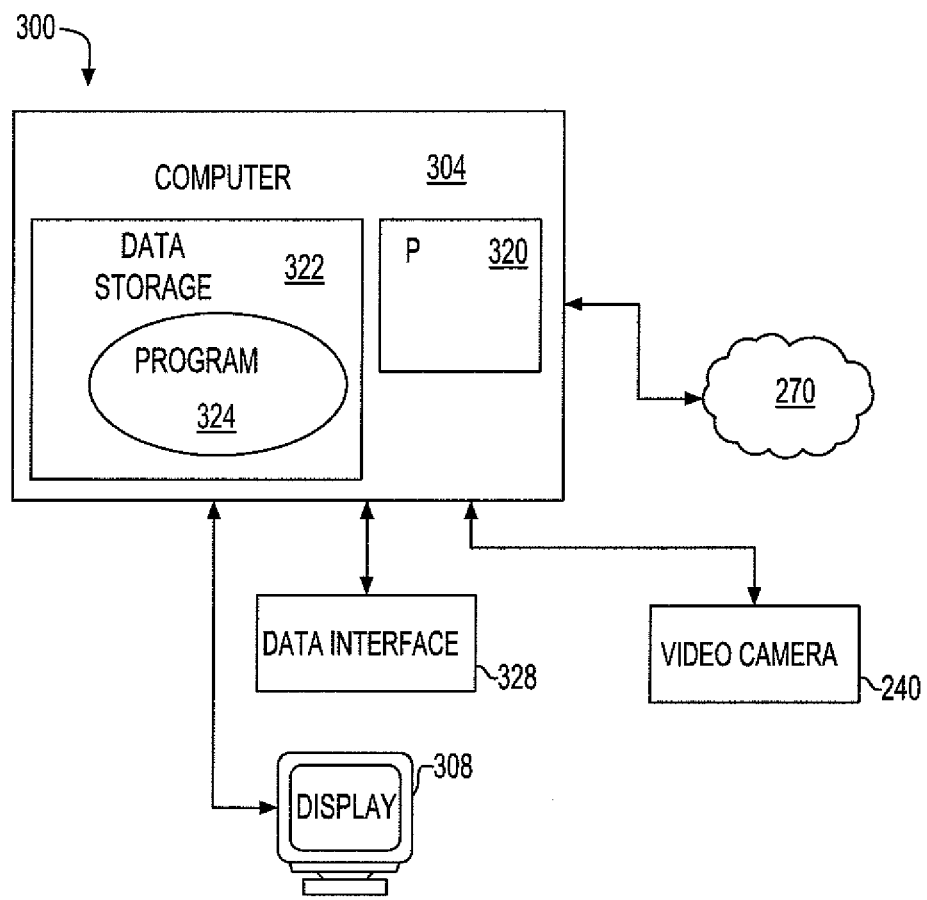
FIG. 9 is a block diagram of an embodiment of a computer system for use with the method and system of the present disclosure.

Referring to FIG. 9, the computer system 300 according to an embodiment of the disclosure includes a computer 304. The computer 304 may be used in conjunction with, or as part of, a server node. The computer 304 includes a data storage device 322 and a software program 324, for example, a program implementing instructions to achieve a result. The software program 324 is stored in the data storage device 322, which may include, for example, a hard drive, or flash memory. The computer 304 is also connected to a video camera 240. The preceding are embodiments of non-transitory computer readable storage mediums which may be encoded with a computer program as part of a computer system.

The processor 320 executes the program instructions from the program 324. The computer 304 may be connected to the network 270, which may include, for example, the Internet, a local area network (LAN), or a wide area network (WAN). The computer 304 may also be connected to a data interface 328 for entering data and the display 308 for displaying information to a user.

As will be appreciated by one skilled in the art, aspects of the embodiments of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may be referred to as a "circuit," "module" or "system". Furthermore, aspects of the present disclosure may take the form of a computer program product embodied in one or more computer readable medium(s) having computer readable program code embodied thereon. Further, combinations of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (including but not limited to) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (and/or systems), and computer program products according to embodiments of the disclosure. It will be understood that blocks of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the present disclosure has been particularly shown and described with respect to preferred embodiments thereof, it will be understood by those skilled in the art that changes in forms and details may be made without departing from the spirit and scope of the present application. It is therefore intended that the present disclosure not be limited to the exact forms and details described and illustrated herein, but falls within the scope of the appended claims.

What is claimed is:

1. A method of notifying a person using a computer including a non-transitory computer readable storage medium encoded with a computer program embodied therein, comprising:
    defining a subliminal range of at least one human sense using a computer system which includes at least one sensory cueing component, the at least one human sense including: sight, hearing, or touch;
    defining a supraliminal range of the at least one human sense using the computer system;
    defining a cue directed to the at least one human sense, the cue being associated with a message;
    determining an alert level associated with the message and classifying the alert level as in the subliminal or supraliminal range;
    determining a presentation methodology of the cue and the message, the presentation methodology including the alert level classification;
    initiating the cue in either the subliminal range or the supraliminal range directed to the at least one human sense in a user's sensory environment using the computer system and the at least one sensory cueing component;
    presenting the cue according to the presentation methodology;
    determining an acknowledgement of the cue and the message by the user is completed in either the subliminal or supraliminal range; and
    removing the cue and the message from the user's sensory environment.

2. The method of claim 1, wherein the alert level classification comprises: when the alert level being beneath a threshold defining the supraliminal range, classifying the message as subliminal; when the alert level being at the threshold, classifying the message as supraliminal; and when the alert level exceeding the threshold, classifying the message as critical.

3. The method of claim 1, wherein the presentation methodology further comprises:
    repeating the cue a specified number of times;
    shifting the cue between the subliminal and supraliminal ranges; and
    increasing or decreasing an attribute of the cue.

4. The method of claim 1, further comprising: presenting a single message in a periphery area or at a center of attention of the user's sensory environment according to the warning level.

5. The method of claim 2, further comprising: presenting the message using a pop-up presentation at the center of attention of the user's sensory environment when the message is classified as critical.

6. The method of claim 1, further comprising: presenting a message as a sequence of orienting cues; and presenting each of the orienting cues with a predefined onset and offset, and each of the orienting cues being followed by the next orienting cue in the sequence.

7. The method of claim 1, further comprising: moving a sequence of cues with their associated message through a series of locations in a visual field by organizing the sequence of messages for moving the user's attention through the visual field.

8. The method of claim 1, further comprising: providing feedback to the computer program from eye tracking the user, using a video camera.

9. The method of claim 1, further comprising: defining an attribute of the cue for perception by a user, the attribute being measurably variable; and
    changing the presentation methodology correspondingly with an increasing or decreasing warning level,
    wherein the changes in presentation methodology comprise a shift between subliminal and supraliminal ranges using the attribute of the cue.

10. The method of claim 1, further comprising:
    initiating the cue in the subliminal range directed to the at least one human sense in the user's sensory environment, repeating the cue a specified number of times;
    increasing a variable attribute of the cue a first specified amount within the subliminal range and initiating the cue;
    increasing the variable attribute of the cue a second specified amount such that the cue enters the supraliminal range and initiating the cue;
    repeating the cue a specified number of times in the supraliminal range;
    increasing the variable attribute of the cue and initiating the cue in the supraliminal range directed to the at least one human sense;
    determining the acknowledgement of the cue by the user; and
    removing the cue from the user's sensory environment.

11. The method of claim 1, wherein a cue is directed to the human sense of sight, and an attribute of the cue directed to the human sense of sight being from a group, comprising: brightness, color, or flashing.

12. The method of claim 1, wherein a cue is directed to the human sense of hearing, and an attribute of the cue directed to the human sense of hearing being from a group, comprising: loudness, tone, pitch, and frequency.

13. The method of claim 1, wherein the at least one sensory cue is visual, and being displayed on a computer display.

14. The method of claim 1, wherein the at least one sensory cue is selected from a group, comprising: a visual cue on a computer display; an audible cue from a speaker connected to the computer; and a tactile cue from a tactile element connected to the computer.

15. The method of claim 1, further comprising:
defining a plurality of cues, each of the plurality of cues being directed to different human senses corresponding to the plurality of cues;
initiating two or more of the plurality of cues in the subliminal range of the corresponding human sense;
increasing a variable attribute of at least one of the cues a specified amount, the variable attribute being increased one or more times, and the cue entering the supraliminal range of the corresponding human sense; and
repeating the operations of claim 1 of:
determining an acknowledgement of the cue by the user is completed in either the subliminal or supraliminal range; and
removing the cue from the user's sensory environment.

16. The method of claim 15, further comprising:
directing a first cue to the human sense of sight, and the attribute of the cue being directed to the human sense of sight being from a group, comprising: brightness, color, or flashing; and
directing a second cue to the human sense of hearing, and the attribute of the cue directed to the human sense of hearing being from a group, comprising: loudness, tone, pitch, and frequency.

17. A computer program product for use with a computer, the computer program product comprising a non-transitory computer readable medium having recorded thereon a computer program or program code, the computer program being executable by a processor for notifying a person using a computer including at least one sensory cueing component, the computer program performing:
defining a subliminal range of at least one human sense, the at least one human sense including: sight, hearing, or touch;
defining a supraliminal range of the at least one human sense;
defining a cue directed to the at least one human sense, the cue being associated with a message;
determining an alert level associated with the message and classifying the alert level as in the subliminal or supraliminal range;
determining a presentation methodology of the cue and the message, the presentation methodology including the alert level classification;
initiating the cue in either the subliminal range or the supraliminal range directed to the at least one human sense in a user's sensory environment;
presenting the cue according to the presentation methodology;
determining an acknowledgement of the cue and the message by the user is completed in either the subliminal or supraliminal range; and
removing the cue and the message from the user's sensory environment.

18. The computer program product of claim 17, further comprising:
presenting a message as a sequence of orienting cues; and
presenting each of the orienting cues with a predefined onset and offset, and each of the orienting cues being followed by the next orienting cue in the sequence.

19. A system for notifying a person using a computer including a non-transitory computer readable storage medium encoded with a computer program embodied therein, comprising:
a computer system;
at least one sensory cueing component being part of the computer system, the sensory cueing component having a defined user sensory environment, the computer system being capable of generating a cue in either a subliminal range or a supraliminal range of a human sense using the sensory cueing component, the computer system being capable of determining when an acknowledgement of the cue and an associated message by the user is completed in the subliminal range, the computer system being capable of determining when an acknowledgement of the cue and the associated message by the user is completed in the supraliminal range,
and the computer system removing the cue and the message from a user's sensory environment.

20. The system of claim 19, wherein the at least one sensory cue is selected from a group, comprising:
a visual cue on a computer display; an audible cue from a speaker connected to the computer; and
a tactile cue from a tactile element connected to the computer.

21. The method of claim 9, wherein the change in presentation methodology comprises:
increasing or decreasing an orienting cue,
changing a motion of the cue;
adding or subtracting a second orienting cue, and
changing luminance or spatial frequency of the cue.

* * * * *